2,850,803

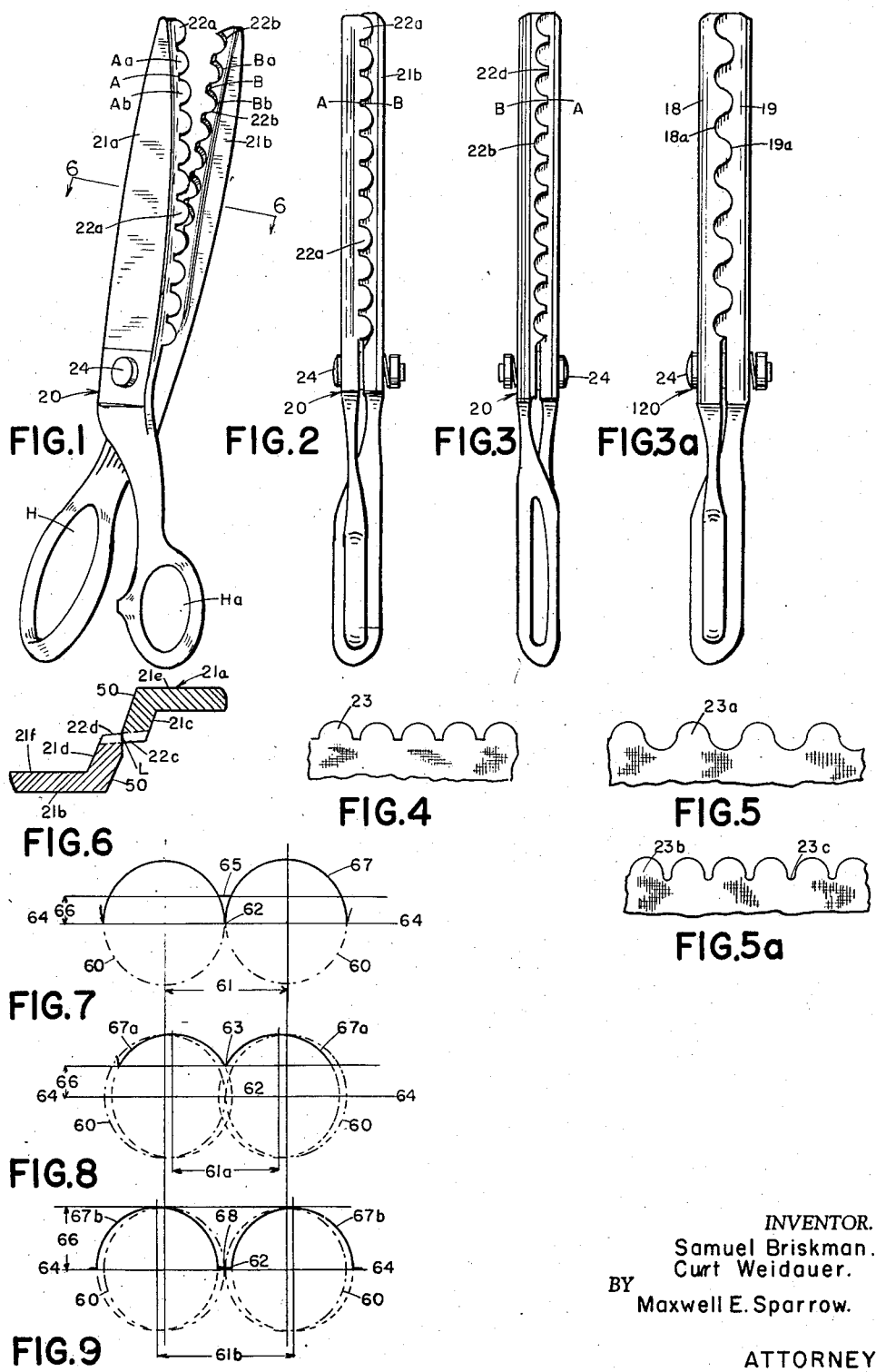
Sept. 9, 1958 S. BRISKMAN ET AL 2,850,803
SHEARS WITH ARCUATE PROFILED TEETH
Filed Nov. 20, 1957
INVENTOR.
Samuel Briskman.
Curt Weidauer.
BY Maxwell E. Sparrow.
ATTORNEY.

SHEARS WITH ARCUATE PROFILED TEETH

Samuel Briskman, New York, and Curt Weidauer, Clinton Corners, N. Y.; said Weidauer assignor to said Briskman Application November 20, 1957, Serial No. 697,568

1 Claim. (Cl. 30—230)

This invention relates to shears with arcuate profiled teeth for forming scalloped cuts or edges in material, and is a continuation in part of our application Serial No. 620,043 filed November 2, 1956.

It is an object of the present invention to provide as an article of manufacture a pair of shears having novel characteristics, construction and combination of parts adapting it to efficiently produce a scalloped or wavy cut in material.

Shears have been manufactured for many years with the cutting edges of each blade formed of straight-sided notches. Teeth of such shears form zigzag cuts in the material, the edges of which are cut straight. Such shears are relatively simple to manufacture since the cutting edge of each blade comprises a series of uniform slanting faces adjacent ones of which taper providing the sharp transverse projecting edges of the blade and providing with the next adjacent slanting faces sharp transverse junctures at the bottom of the blade which are uniformly spaced in relation to the sharp transverse projecting edges of the blade, so that the sharp transverse projecting edges of one blade will contact the sharp transverse junctures at the bottom of the blade with contiguous slanting faces of both blades coming into contact during the cutting operation.

The construction and manufacture of such shears with notched or serrated cutting blades for a pinking operation become relatively simple because of the fact that the side slanting faces are relatively flat and straight, that is, because of the absence or curves in the teeth, and further because of the fact that the blade cutting edges of conventional pinking shears have an included angle of 90° or more between adjacent slanting faces of the teeth. If the included angle was less than 90°, then it would be more difficult for the cutting edges of the shear blades to pink and the teeth points or sharp knife-like edges would be considerably weakened.

In a full scallop (whose curve is substantailly a semi-circle), the included angle between the faces of adjacent scallops is less than 90°.

The scalloped cutting edge of each blade of a pair of shears comprises a continuous series of curves or circle segments, the curve of a full scallop embodying substantially a semi-circle. If the divisions of the curves of the scallops coincide with their diameters, which form the center line or axis of the scalloped cutting teeth, then the peripheries of adjacent scallops would meet or contact at points along the said axis or center line and the contacting points would merely comprise a series of feather edges, making the shears difficult to manufacture and to efficiently perform the scallop-cutting operation. This would be so in both the male and female cutting edges of the blades.

The aforementioned conditions had to be considered and were overcome by constructing a pair of shears according to the invention which efficiently performs a scalloping operation.

A pair of shears of shallow scalloped configuration may be produced by bringing the adjacent faces or curves in substantial contact with each other, but in that event the spacing section between adjacent scallops would be reduced in width and the scallops in height. That is, the less the width of the spacing section between adjacent scallops, the less in height or the shallower the scallops would be.

However, wavy or sinusoidal cutting edges may be produced wherein the convex sections thereof comprise the spacing sections and in this event the waves may be made deep or shallow.

Heretofore, attempts have been made to provide shears for cutting scalloped forms or edges in material, but without practical success.

We are aware that the use of shears having scalloped or undulated edges for cutting a scalloped form or edge has been suggested, for example, in Austin Patent No. 489,406 dated January 3, 1893 and in Yanker's British Patent No. 3,263 dated February 16, 1905. But no practical means of carrying out the suggestion have to our knowledge been devised since the advent of pinking shears many years ago.

During the course of those years a demand had been built up in the industry and trade and by the public and there was a long-felt need for a pair of shears which would form scalloped and undulated cuts in material and in the edges thereof. It was not until shears according to the present invention were made that such demand and need were satisfied.

In the Austin Patent No. 489,406, various designs of cut edges, including scallops and undulations, are shown by the patentee which he contemplated employing in the manufacture of his shears, but he does not disclose or even suggest in his patent a construction of shears or means for constructing or producing shears for cutting the shown scallops and undulations.

Ordinary or conventional scissors have straight cutting edges and accomplish the cutting operation by a wiping engagement between these straight cuttings edges. Yanker's British Patent No. 3,263 merely provides curved edges in the same type of scissors in an attempt to produce the same cutting action. This patent shows the blades in the same wiping relation as is found in conventional scissors (with straight-cutting edges) and also shows that the curved notches are formed directly in the edge, in the same plane as the blade. A scalloped cut could not be accomplished with such scissors.

It is believed that another difficulty encountered in providing a pair of shears having scalloped or undulated cutting edges for producing scalloped or wavy cuts in material resided in the fact that, the teeth being curved, teeth in one of the shear blades could not be made to clear the respective teeth progressively in the other shear blade for a scallop-cutting operation as the teeth do in conventional pinking shears.

This difficulty has been overcome herein by connecting the equidistant curved faces or portions of the cutting edge of each blade by equidistant spacing faces or portions, both the former portions and the latter portions being concentric to the shear's pivotal axis, while providing at the same time a rake or cutting clearance in the curved faces and spacing faces or portions of the teeth. It is, therefore, a further object of the present invention to provide a pair of shears having these characterizations.

The shears described herein may be made with the apparatus and cutting tools described in our copending application Serial No. 697,569 filed November 20, 1957.

The invention will now be described in greater detail with reference to the accompanying drawing, in which:

Fig. 1 is a perspective view of a pair of shears having spaced-apart arcuate or scalloped edges formed according to an embodiment of the invention;

Fig. 2 is an edge view of the shears shown in Fig. 1;

Fig. 3 is a reversed view similar to Fig. 2 showing a pair of shears with scalloped edges;

Fig. 3a is an edge view of a pair of shears having sinusoidal or undulated edges according to a further embodiment of the invention;

Fig. 4 shows a scalloped cut made on a piece of material with a pair of shears according to Figs. 1, 2 and 3;

Fig. 5 shows cuts made on a piece of material with a pair of shears with wavy-shaped teeth;

Fig. 5a shows a modified scalloped cut on a piece of material;

Fig. 6 is a fragmentary cross-section taken on the line 6—6 of Fig. 1; and

Figs. 7, 8, and 9 diagrammatically illustrate conditions respecting formations of scallop-cutting edges in shears.

The scalloped cutting edge of a shear blade comprises a continuous series of curves or circle segments, convex on one blade and concave on the mating blade.

Figs. 7, 8 and 9 diagrammatically illustrate conditions respecting formations of scallop-cutting edges in shears, wherein 61, 61a and 61b indicate respective center-line to center-line distances in adjacent circle segments, forming the curves of scallops, the number 64 representing the center axis. The circles in dot-dash lines are all of the same size and the contacting or meeting point will be that of the radii of adjacent circles indicated at 62. The semicircles above the axis 64 each represent the curve of full scallop cut-outs, and it can be readily seen that the transverse edge formed by the contacting faces 62 of adjacent curved segments would be merely a feather-edged line. This would be true of both concave and convex mating scallops of both blades of the shears, so that it would be difficult to maintain transverse cutting edges or junctures in the blades. In order to overcome this condition, the curved segments 67 (Fig. 7) are separated and the connecting spacing section 68 (Fig. 9) between the circle segments 67b of circle 60 is introduced therebetween, providing between the concave segments a transverse bed in the male shear blade and between the convex segments a transverse ridge in the female shear blade.

As can be seen from Figs. 7 and 8, the arcs or circle segments 67 would have to be made shallower, that is, of diminished height 66 and which would require a cut-off as indicated at 65 (Fig. 7) and these arcs or circle segments indicated by 67a (Fig. 8) would have to be brought together at the point 63, in order to possibly use a feather-edged transverse ridge or bed between scallops.

Since the scallops formed thus would be of diminished height, the transverse beds formed therebetween of one blade and the corresponding mating transverse ridges of the other blade would also be of diminished width, the height or shallowness of the concave and convex scallops which can be used for an efficient cutting operation being in a measure dependent on the width of said beds and ridges.

Figs. 1, 2 and 3 show a pair of shears 20 having blades 21a, 21b including body portions 21e, 21f and lateral inwardly directed flanges 21c, 21d (Fig. 6). The flanges are provided respectively with spaced tooth portions 22a of convex curvilinear configuration and spaced notch portions 22b of exactly complementary concave curvilinear configuration, the profiles of which intermesh to form cuts 23 (Fig. 4) of scalloped shape. Means pivotally connecting the shear blades for rotation about a fixed axis has been indicated at 24.

The mating curved or arcuate portions 22a and 22b provided on blades 21a and 21b, respectively, are separated or connected together by the spacing portions A and B, which are required for the cutting operation by the shears to produce a scalloped edge on the material being cut as seen in Fig. 4. The connecting portions A are between, and lie in a plane at the ends of, the several tooth portions 22a on the blade 21a, while the edge portions B are between the notch portions 22b on the blade 21b. The portions A and B are, of course, exactly complementary.

If the arcs Aa, Ab and Ba, Bb (Figs. 1 and 2) were to meet or intersect at their peripheries on the axis or center line of the curves (that is, were not spaced apart), then the adjoining teeth would form sharp points where they join, and the blade would be difficult to manufacture and also difficulty would be encountered in cutting through the material due to the fact that the thin feather edge would not offer sufficient resistance for the blades to stand up in use. Therefore, it is extremely desirable to space the arcs Aa, Ab in order to form the spacing portions or areas A, B, chipping and point wear at critical points being thus also prevented.

It is understood that the cutting edges of the blades may be modified to provide arcuate spacing portions between the adjoining teeth. Thus, Fig. 3a shows a pair of shears 120 with modified teeth profiles wherein the spacing portions 18a of the blade 18 are concave matching the convexity of the mating portions of blade 19, and the spacing portions 19a of the blade 19 are likewise concave matching the convexity of the mating portions of blade 18. The resulting cut has been shown at 23a in Fig. 5. Furthermore, the cutting edges of the shear blades may be modified to provide the scalloped cut seen in Fig. 5a, wherein the scallop portions 23b are connected by the spacing portions 23c.

Shears made according to the invention depicted in Figs. 1 to 3 are adapted to make scalloped cuts or edges of either convex or concave configuration. In other words, it is possible with the same shears to make entirely two different types of designs of scalloped or undulated edges. This is brought about because of the fact that, although the teeth of one blade of the shears are complementary to the teeth of the other blade of the shears, and edge with concave scallops and an edge with convex scallops are simultaneously made when the material is cut with the shears.

If it is desirable to adapt or use the shears for this dual purpose, it is preferable to make both handles H and Ha substantially identical so that the shears may be conveniently reversed for use to make the edge of a piece of material of the concave scalloped or convex scalloped design.

A cutting clearance or rake on the land 50 (Fig. 6) of preferably four degrees, more or less, is provided. This may be accomplished, when preparing the blade for the teeth-cutting operation, by mounting it on a support at the aforesaid angle with relation to the support. Thus, the land 50 makes an acute angle with respect to the face of the blade. After the blades are assembled, they are lapped as indicated at L (Fig. 6), to insure a perfect cutting edge.

It is quite apparent that the shears made according to the invention herein described may be sharpened by merely grinding the flanges.

From Fig. 6 it will be further noted that the lapped forward or leading face L of each tooth is perpendicular to the plane of rotation of each blade. It will further be seen that the confronting faces 22c, 22d of the flanges 21c and 21d, which include the tooth portions 22a, the connecting portions A, and the notch portions 22b (Figs. 1 and 2), are each beveled so as to be tangent to a plane which is inclined with respect to the plane of rotation and which therefore encloses an acute angle with the substantially horizontal faces L. This is important for the purpose of insuring smooth operation and a clean cut.

We claim:

Shears comprising a pair of blades, a fixed axis, means pivotally connecting said blades for rotation about said fixed axis, each of said blades having a body and a lateral inwardly directed flange angularly disposed with relation to said body, one of said flanges having a series of spaced convex curvilinear tooth portions projecting therefrom and a series of connecting portions between said tooth portions, said connecting portions lying in a plane at the ends of said curved portions, the other of said flanges having a series of spaced concave curvilinear notch portions therein exactly complementary to said tooth portions and a series of edge portions exactly complementary to said connecting portions of said one flange and connecting said notch portions, the leading faces of said flanges being perpendicular to the plane through which said blades move, and the confronting faces of said tooth portions, connecting portions and notch portions each having a surface at least a part of which is sloped with respect to said leading faces of said flanges at an acute angle.

References Cited in the file of this patent

UNITED STATES PATENTS

| | | |
|---|---|---|
| 489,406 | Austin | Jan. 3, 1893 |
| 1,970,408 | Weidauer | Aug. 14, 1934 |
| 2,204,071 | Dalley | June 11, 1940 |
| 2,286,874 | Schwartz | June 16, 1942 |
| 2,574,066 | See | Nov. 6, 1951 |
| 2,590,024 | Lieberman | Mar. 18, 1952 |
| 2,677,179 | Servilla | May 4, 1954 |
| 2,776,482 | Hafekost | Jan. 3, 1957 |

FOREIGN PATENTS

| | | |
|---|---|---|
| 3,263 | Great Britain | of 1905 |
| 179,823 | Switzerland | Jan. 2, 1936 |